United States Patent
Lee et al.

(10) Patent No.: US 8,463,336 B1
(45) Date of Patent: Jun. 11, 2013

(54) METHOD FOR REPRODUCING MUSIC FILE OF MOBILE COMMUNICATION TERMINAL AND MOBILE TERMINAL IMPLEMENTING THE SAME

(71) Applicant: Samsung Electronics Co. Ltd., Suwon-si (KR)

(72) Inventors: Jong-Sub Lee, Daegu (KR); Kyoung-Ae Lim, Seoul (KR); Kyoung-Shin Lee, Seoul (KR); Seung-Chul Choi, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/738,758

(22) Filed: Jan. 10, 2013

Related U.S. Application Data

(63) Continuation of application No. 11/395,255, filed on Apr. 3, 2006, now Pat. No. 8,380,260.

(30) Foreign Application Priority Data

Apr. 1, 2005 (KR) .......... 10-2005-0027533
Mar. 6, 2006 (KR) .......... 10-2006-0020900

(51) Int. Cl.
    *H04M 1/00* (2006.01)
(52) U.S. Cl.
    USPC .......... 455/575.2; 455/569.1; 455/550.1; 455/556.1; 381/94.5
(58) Field of Classification Search
    USPC ...... 455/575.2, 569.1, 550.1, 556.1; 381/94.5
    See application file for complete search history.

(56) References Cited

U.S. PATENT DOCUMENTS

| | | | |
|---|---|---|---|
| 6,407,325 B2 | 6/2002 | Yi et al. | |
| 7,254,415 B2 | 8/2007 | Okamura | |
| 7,409,064 B2 | 8/2008 | Watanuki | |
| 2001/0004397 A1 | 6/2001 | Kita et al. | |
| 2001/0027396 A1 | 10/2001 | Sato | |
| 2002/0045438 A1 | 4/2002 | Tagawa et al. | |
| 2002/0098876 A1 | 7/2002 | Engstrom et al. | |
| 2002/0116541 A1 | 8/2002 | Parker et al. | |
| 2003/0162571 A1 | 8/2003 | Chung | |
| 2004/0106424 A1 | 6/2004 | Yoshizawa | |
| 2005/0070251 A1 | 3/2005 | Satake et al. | |
| 2006/0183097 A1* | 8/2006 | Ishii .......... | 434/307 R |
| 2010/0115149 A1 | 5/2010 | Ewer | |

FOREIGN PATENT DOCUMENTS

| | | |
|---|---|---|
| CN | 1705317 A | 3/2005 |
| EP | 1128643 A2 | 8/2001 |
| EP | 1179944 A2 | 2/2002 |
| EP | 1276309 A2 | 1/2003 |
| EP | 1404026 A1 | 3/2004 |
| JP | 200282674 A | 3/2002 |
| KR | 1020010001377 A | 1/2001 |

* cited by examiner

Primary Examiner — Allahyar Kasraian
(74) Attorney, Agent, or Firm — Jefferson IP Law, LLP

(57) ABSTRACT

A mobile communication terminal is provided including an audio processing unit, a speaker, a connecting unit that connects to an external audio output device and indicates whether the external audio output device is connected, and a control unit configured to, while in a silent mode, control the audio processing unit to reproduce a music file and to output audio signals, corresponding to the reproduced music file, through the speaker, the silent mode being a mode wherein a vibration signal is generated upon receiving an incoming call, if the external audio output device is connected to the connecting unit, output the audio signals to the external audio output device, and if the external audio output device is disconnected from the connecting unit while the audio signals are being output to the external audio output device, control the display unit to display a user interface for continuing reproduction of the music file.

23 Claims, 7 Drawing Sheets

METHOD FOR REPRODUCING MUSIC FILE OF MOBILE COMMUNICATION TERMINAL AND MOBILE TERMINAL IMPLEMENTING THE SAME

PRIORITY

This application is a continuation application of U.S. patent application Ser. No. 11/395,255 filed Apr. 3, 2006 in the U.S. Patent and Trademark Office, which claims the benefit of Korean Patent Applications No. 10-2005-0027533 and 10-2006-0020900, filed on Apr. 1, 2005 and Mar. 6, 2006, in the Korean Intellectual Property Office, the disclosure of each of which is incorporated herein in its entirety by reference.

BACKGROUND OF THE INVENTION

1. Field of the Invention

The present invention relates to a mobile communication terminal. More particularly, the present invention relates to a mobile communication terminal and a method for reproducing a music file during the manner mode of the mobile communication terminal.

2. Description of the Related Art

In general, a mobile communication terminals refers to a device which permits talking or exchanging data for communication while a user is moving, such as a cellular phone, a Personal Digital Assistant (PDA), a Personal Communication Services Phone (PCS), an International Mobile Telecommunication-2000 (IMT-2000) terminal, a Global System for Mobile Communication (GSM) terminal, and the like.

Portable communication devices have become popular, and are recognized by some people as a nearly indispensable commodity which should be carried all the time. Therefore, in order to facilitate portability, designs of such portable communication devices tend not only to be compact, slim and light, but be also moving toward providing multimedia availability, and having a wider variety of functions. In particular, future portable communication devices are expected to incorporate greater multi-functionality and be capable of multi-purpose utilization, as well as being more compact, light, and capable of being modified to be suitable for various multimedia or Internet environments.

On the other hand, mobile communication terminals provide additional function services such as the short message transmitting/receiving function, the memory function for storing and searching for telephone numbers, the locking function, the alarm function, the background screen setting function, the local number confirmation function, as well as the talking function. Further, recent communication terminals provide the camera function, the digital broadcasting function, the game function, and the music reproducing function, such as the MPEG Audio layer-3 (MP3) file reproducing function.

Mobile communication terminals, hence, provide much convenience to users through the various additional services.

Especially, among the additional services of the mobile communication terminals, the music file reproducing function permits reproduction of music files stored in the mobile communication terminals, MP3 files to be downloaded from separate devices, or the like, and then the output of these files through a speaker. Therefore, a user can listen to the selected music through the speaker embedded in a mobile communication terminal, a separate exterior speaker, or an earphone.

However, conventional mobile communication terminals cannot reproduce music files during the manner mode, such as silent mode, in which signal reception is output without sound or by vibration, in other words, with a vibration alert of an incoming call. Therefore, in order to listen to music through a conventional mobile communication terminal during the manner mode, a user should release and convert the manner mode to the music file reproducing mode.

SUMMARY OF THE INVENTION

Accordingly, the present invention has been made to address the above-mentioned problems, and an aspect of the present invention is to provide a mobile communication terminal and a method for reproducing a music file during the manner mode of the mobile communication terminal.

Another aspect of the present invention is to provide a mobile communication terminal and a music file reproduction method which can allow a user to conveniently reproduce the music file.

In order to accomplish these aspects, a method of a mobile communication terminal in a silent mode for reproducing a music file and outputting audio signals, corresponding to the music file being reproduced, through a speaker of the mobile communication terminal or an external audio output device, wherein in the silent mode the mobile communication terminal generates a vibration signal in response to receiving an incoming call, is provided. The method includes, while the mobile communication terminal is in the silent mode, reproducing the music file and outputting the audio signals, corresponding to the music file being reproduced, through the speaker of the mobile communication terminal, detecting a connection between the external audio output device and the mobile communication terminal, based on the detection of the connection between the external audio output device and the mobile communication terminal, outputting the audio signals, corresponding to the music file being reproduced, to the external audio output device, during the outputting of the audio signals to the external audio output device, detecting a disconnection between the external audio output device and the mobile communication terminal, and based on the detection of the disconnection between the external audio output device and the mobile communication terminal, providing a user interface for continuing reproduction of the music file.

In addition, a mobile communication terminal is provided. The mobile communication terminal includes an audio processing unit, a speaker, a connecting unit, and a control unit. The connecting unit connects to an external audio output device and indicates to the control unit whether the external audio output device is connected to the connecting unit. The control unit is configured to, while in a silent mode, control the audio processing unit to reproduce a music file and to output audio signals, corresponding to the reproduced music file, through the speaker, the silent mode being a mode in which a vibration signal is generated in response to receiving an incoming call, if the external audio output device is connected to the connecting unit, output the audio signals to the external audio output device, and if the external audio output device is disconnected from the connecting unit while the audio signals are being output to the external audio output device, control the display unit to display a user interface for continuing reproduction of the music file.

Furthermore, a mobile communication terminal is provided. The mobile communication terminal includes an audio processing unit, a speaker, a connecting unit, a touch screen, and a control unit. The connecting unit connects to an external audio output device and indicates to the control unit whether the external audio output device is connected to the connecting unit. The touch screen displays and receives an input. The control unit is configured to, based on a user request while in a silent mode, control the audio processing unit to reproduce a music file and to output audio signals, corresponding to the reproduced music file, through the speaker, the silent mode being a mode in which a vibration signal is generated in response to receiving an incoming call, if the external audio output device is connected to the connecting unit, output the audio signals to the external audio output device, and if the external audio output device is disconnected from the connecting unit while the audio signals are being output to the external audio output device, control the touch screen to display a user interface for continuing reproduction of the music file.

BRIEF DESCRIPTION OF THE DRAWINGS

The above and other aspects, features, and advantages of the present invention will be more apparent from the following detailed description taken in conjunction with the accompanying drawings, in which.

Throughout the drawings, like reference numerals will be understood to refer to like parts, components and structures.

DETAILED DESCRIPTION OF EXEMPLARY EMBODIMENTS

Hereinafter, exemplary embodiments of the present invention will be described with reference to the accompanying drawings. In the following description of the present invention, a detailed description of known functions and configurations incorporated herein is omitted for clarity and conciseness.

Figure 1:
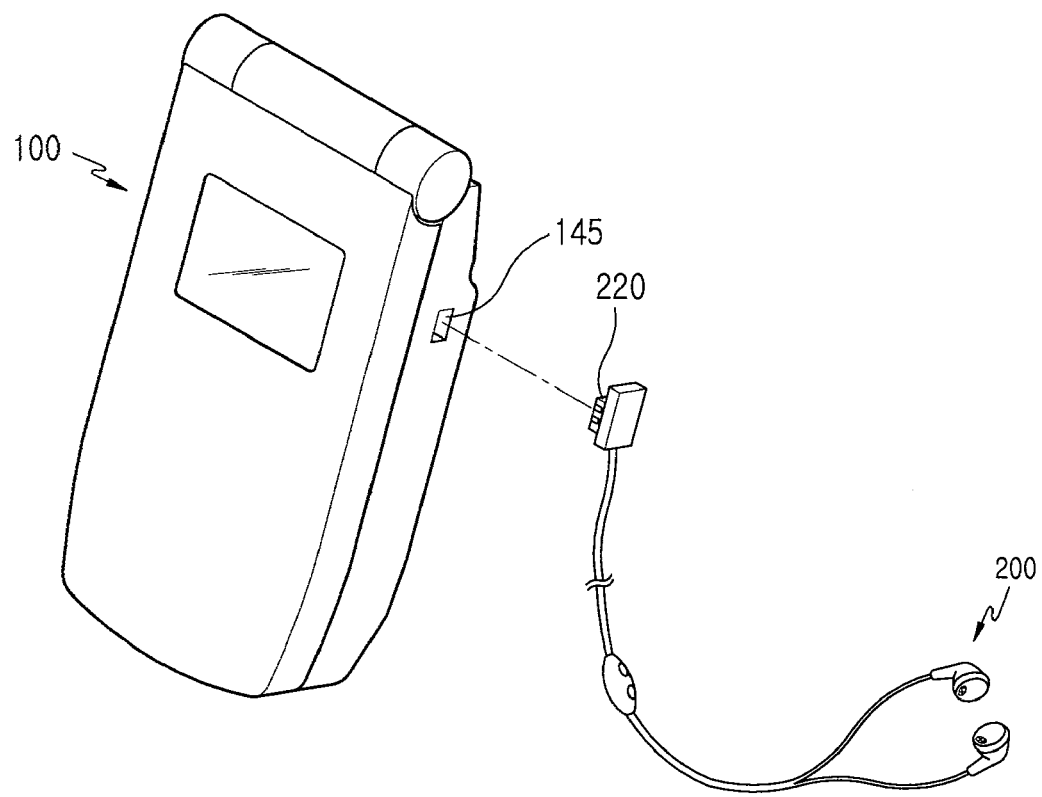
FIG. 1 is a view for showing a mobile communication terminal and an external output device according to an exemplary embodiment of present invention and an earphone.

FIG. 1 is a view for showing a mobile communication terminal and an external output device (that is, an ear phone) according to an exemplary embodiment of present invention. Although the ear phone is shown in FIG. 1 as the external output device, the external output device may comprise a speaker or a wireless headset.

Referring to FIG. 1, the mobile communication terminal 100 comprises a jack connecting unit 145 to which a jack 220 of the earphone 200 is connected, and a user connects the earphone 220 to the mobile communication terminal 100 by inserting a jack 220 of the earphone 200 into the jack connecting unit 145. Meanwhile, the mobile communication terminal 100 may comprise a short range wireless communication unit, such as an IrDA wireless communication unit or a Bluetooth communication unit.

Therefore, a user can listen to a music file, for example, an MPEG Audio layer-3 (MP3) file, reproduced by the mobile communication terminal 100 through the earphone 200 connected to the mobile communication terminal 100. Although not shown in the figure, keys required for reproduction of music files can be provided in the earphone 200.

Figure 2:
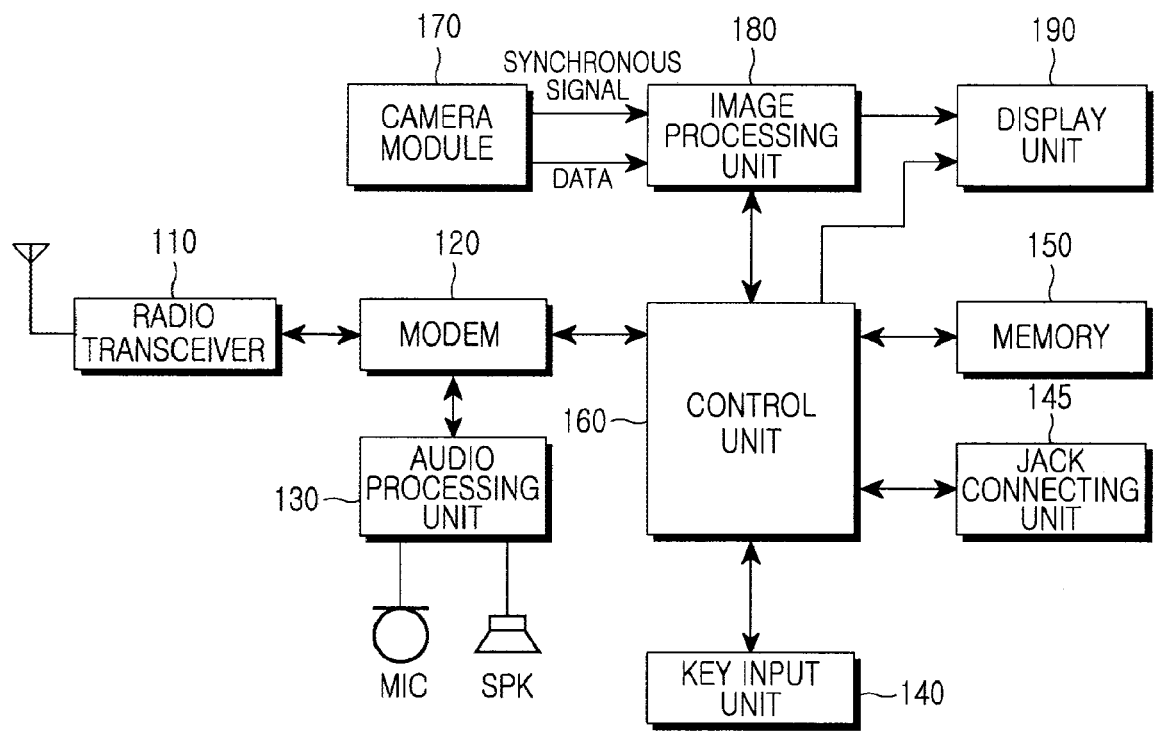
FIG. 2 is a block diagram of a mobile communication terminal according to an exemplary embodiment of the present invention.

FIG. 2 is a block diagram of a mobile communication terminal according to an exemplary embodiment of the present invention.

The mobile communication terminal 100 comprises a radio transceiver 110, a modem 120, an audio processing unit 130, a key input unit 140, a jack connecting unit 145, a memory 150, a control unit 160, a camera module 170, an image processing unit 180, and a display unit 190. In addition, the mobile communication terminal 100 can further comprise a short range wireless communication unit, such as a Bluetooth communication unit, for the purpose of wireless connection with the external output device.

Referring to FIGS. 1 and 2, the radio transceiver 110 transmits and receives voice data, letter data, image data, and control data, under the control of the control unit 160. The radio transceiver 110 comprises a RF transmitter for raising and amplifying the frequencies of transmitted signals and a RF receiver for amplifying received signals with low noise and lowering the frequencies.

The modem 120 comprises a transmitter for encoding and modulating the transmitted signals and a receiver for decoding and demodulating the received signals.

The audio processing unit 130 modulates the electrical signals input from a microphone and converts them to voice data, and demodulates the encoded voice data input from the radio transceiver 110 into electrical signals and outputs them to a speaker. Further, it is preferable that the audio processing unit 130 comprises a codec to convert the digital audio signals received by the radio transceiver 110 to analog signals and then reproduce them or to convert the analog audio signals generated in the microphone to digital audio signals. The codec comprises a data codec for processing packet data and an audio codec for processing audio signals such as voices. The codec can be provided in the control unit 160.

The audio processing unit 130 outputs the audio signals of the music file reproduced in the mobile communication terminal 100 to the earphone 200 when the earphone 200 is connected to the mobile communication terminal 100 through a wireless or a wired manner.

The key input unit 140 has a key matrix structure (not shown), and comprises letter keys, number keys, function keys, and exterior volume keys to output the key input signals corresponding to the keys input by a user to the control unit 160. The key input unit 140 can separately comprise keys, for example, reproduction keys, for reproducing the music file, and can embody one of the keys provided in the key input unit 140 by the keys for reproduction of the music file.

The jack connecting unit 145 is a connecting terminal for connecting the earphone 200 to the mobile communication terminal 100 through a wired manner, and if the jack 220 of the earphone 200 is inserted into the mobile communication terminal 100, the detected signal is transferred to the control unit 160. Further, the jack connecting unit 145 outputs the audio signals of the music file to the earphone 200, if the music file, for example, MP3 file, is reproduced in the mobile communication terminal 100, with the jack 220 of the earphone 200 inserted into the mobile communication terminal 100.

The memory 150 can comprise a program memory and a data memory, and stores selected information on the basis of the information required for controlling the operation of the mobile communication terminal 100 according to an exemplary embodiment of the present invention and the user selecting information. In other words, the memory 150 comprises a Read Only Memory (ROM) for storing the management algorithm accessed through the control unit 160 for the overall operation of the mobile communication terminal 100 and a Random Access Memory (RAM) for storing data according to control instructions in a data processing step of the control unit 130. Further, the memory stores various music files required for reproduction of music file.

The control unit 160 controls the overall operation of the mobile communication terminal according to an exemplary embodiment of the present invention. The control unit 160 controls the mobile communication terminal to reproduce the music file if the reproduction of the music files is requested by the user during the manner mode in which signal reception is output without sound or by vibration in the case in which the signal is received by the mobile communication terminal 100. The user can request the reproduction of music files by inputting keys or connecting the external output device to the mobile communication terminal.

For instance, if the external output device is connected to the mobile communication terminal during the manner mode, the control unit 160 directs the mobile communication terminal to reproduce the music file. In addition, the control unit 160 can output a confirmation message for determining the reproduction of the music files when the external output device is connected to the mobile communication terminal. When the music file reproduction is requested by a user, the confirmation message informs the user that the mobile communication terminal 100 is in the manner mode and enables the user to confirm the reproduction of the music file during the manner mode. The confirmation message can be output through the audio processing unit 130, and can be output in a letter message through the display unit 190.

After outputting the confirmation message, the control unit 160 determines that the user has confirmed the output confirmation message if the external output device, such as the earphone or the speaker, is connected to the mobile communication terminal and directs the mobile communication terminal to reproduce the music files selected by the user. The control unit 160 can control the mobile communication terminal such that the mobile communication terminal may reproduce the music file only when the user requests it in a state in which the external output device is connected to the mobile communication terminal.

In addition, after outputting the confirmation message, the control unit 160 can determine that the user has confirmed the output confirmation message if a predetermined key of the key input unit 140 is input and then can direct the mobile communication terminal to reproduce the music files selected by the user. The predetermined key can be a confirmation key provided in the key inputting unit 140 and can be a key provided for the reproduction of the music files.

On the other hand, it is preferable if the control unit 160 outputs a message inquiring termination of the music file reproduction when the external output device is disconnected from the mobile communication terminal 100 In this case, if the user who has confirmed the message requests the termination of the music file reproduction, the control unit 160 direct the mobile communication terminal 100 to terminate the music file reproduction.

The camera module 170 can comprise a lens unit (not shown) which can be inserted and withdrawn, and photographs image data. Further, the camera module 170 comprises a camera sensor (not shown) for converting the photographed optical signals into electrical signals and a signal processing unit (not shown) for converting the analog image signals photographed by the camera sensor to digital data.

Here, the camera sensor is assumed to be a Charge Coupled Device (CCD) sensor, and the signal processing unit can be embodied with a Digital Signal Processor (DSP). The camera sensor and the signal processing unit can be embodied integrally or separately.

The image processing unit 180 generates screen data for displaying the image signals output in the camera module 170.

The image processing unit 180 processes the image signals output in the camera module 170 in frame unit and outputs the frame image data according to the characteristics and size of the display unit 190. Further, the image processing unit 180 comprises an image codec. The image processing unit 180 compresses the frame image data displayed in the display unit 190 or restores the compressed frame image data to the original frame image data.

Further, the image processing unit 180 is assumed to have the On Screen Display (OSD) function and can output OSD data according to the size of the screen displayed under the control of the control unit 160.

The display unit 190 can comprise a Liquid Crystal Display (LCD) and the like and outputs display data generated in the mobile communication terminal. Then, if the LCD is embodied in touch screen type, the display unit 190 can be used as an input unit.

Further, the display unit 190 displays image signals output in the image processing unit 180 and displays user data output in the control unit 160.

On the other hand, according to the present invention, a player device for reproducing music files can be separately embedded in the mobile communication terminal 100.

Figure 3:
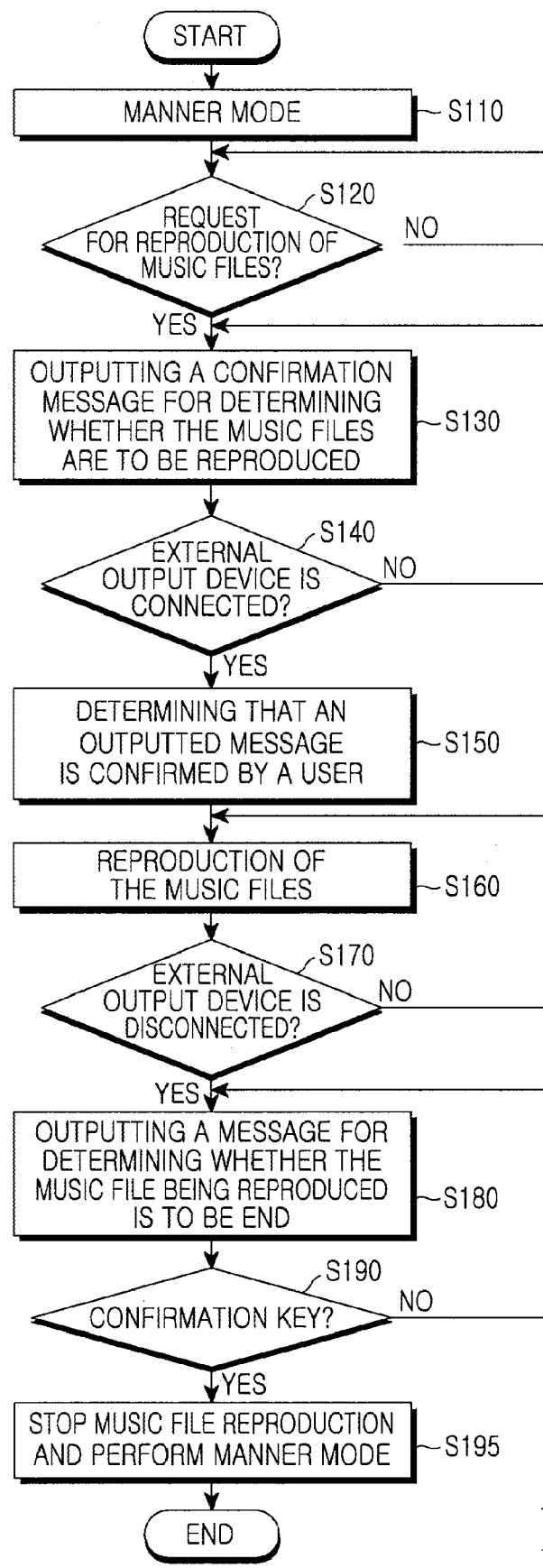
FIG. 3 is a flow chart for explaining a music file reproducing process of a mobile communication terminal according to an exemplary embodiment of the present invention.

FIG. 3 is a flow chart for explaining the music file reproducing process of the mobile communication terminal according to an exemplary embodiment of the present invention.

Referring to FIGS. 1 to 3, the control unit 160 converts the signal reception sound output mode of the mobile communication terminal 100 to the manner mode on the basis of the user's request and performs the corresponding operation at step S110.

The control unit 160 examines whether the reproduction of music files, for example, MP3 files, is requested by a user during the manner mode of the mobile communication terminal 100 at step S120.

If the reproduction of the music files are requested by the user, the control unit 160 starts the music file reproduction mode, for example, MP3 reproduction mode, of the mobile communication terminal 100 and outputs a confirmation message for determining whether the music files are to be reproduced or not during the manner mode at step S130. The confirmation message informs the user that the mobile communication terminal 100 is performing the manner mode when the reproduction of the music files is requested by the user, and enables the user to confirm whether the music files are to be reproduced or not during the manner mode of the mobile communication terminal 100. The confirmation message is output in a voice message through the audio processing unit 130 or in a letter message through the display unit 190.

The control unit 160 determines whether the external output device is connected to the mobile communication terminal 100 at step S140. The external output device may comprise an earphone or a speaker and the mobile communication terminal 100 can be connected to the external output device through a wireless or a wired manner. Referring to FIG. 1, the control unit 160 determines whether the earphone 200, that is, the earphone jack 220 is inserted into the jack connecting unit 145.

The control unit 160 determines that the output confirmation message is confirmed by the user if the external output device is connected to the mobile communication terminal 100 (that is, if the earphone jack 220 is inserted into the jack connecting unit 145) at step S150. Then, the control unit 160 reproduces the music files selected by the user at step S160. The audio signals of the reproduced music files are output through the external output device. Meanwhile, the control unit 160 can control the mobile communication terminal 100 such that the mobile communication terminal 100 may reproduce the music file only when the user requests it in a state in which the external output device is connected to the mobile communication terminal 100.

The control unit 160 determines whether the external output device is disconnected from the mobile communication terminal 100 during the reproduction of the music files at step S170. For instance, if the earphone is connected to the mobile communication terminal 100, the control unit 160 determines whether the earphone jack 220 is disconnected from the mobile communication terminal 100.

If the external output device is disconnected from the mobile communication terminal 100, the control unit 160 outputs a message for inquiring the user whether reproduction of the music files must be continued at step S180.

Then, the control unit 160 determines whether a confirmation key is input at step 190. If the confirmation key is input, the control unit 160 determines that the user wants to end the reproduction of the music files, so the control unit 160 ends the reproduction of the music files at step 195.

On the other hand, if incoming call signals are received during the reproduction of the music files, it is preferable that the control unit 160 stops the reproduction of the music files and outputs an indication of the reception of the incoming call signals by vibration or without sound according to the set manner mode.

It should be noted that although an exemplary embodiment of the present invention exemplifies the case in which an earphone jack 220 is connected to the mobile communication terminal 100, the process of FIG. 3 can be applied to the case in which a jack of an exterior speaker is connected to the mobile communication terminal 100 in a wireless manner.

Figure 4A:
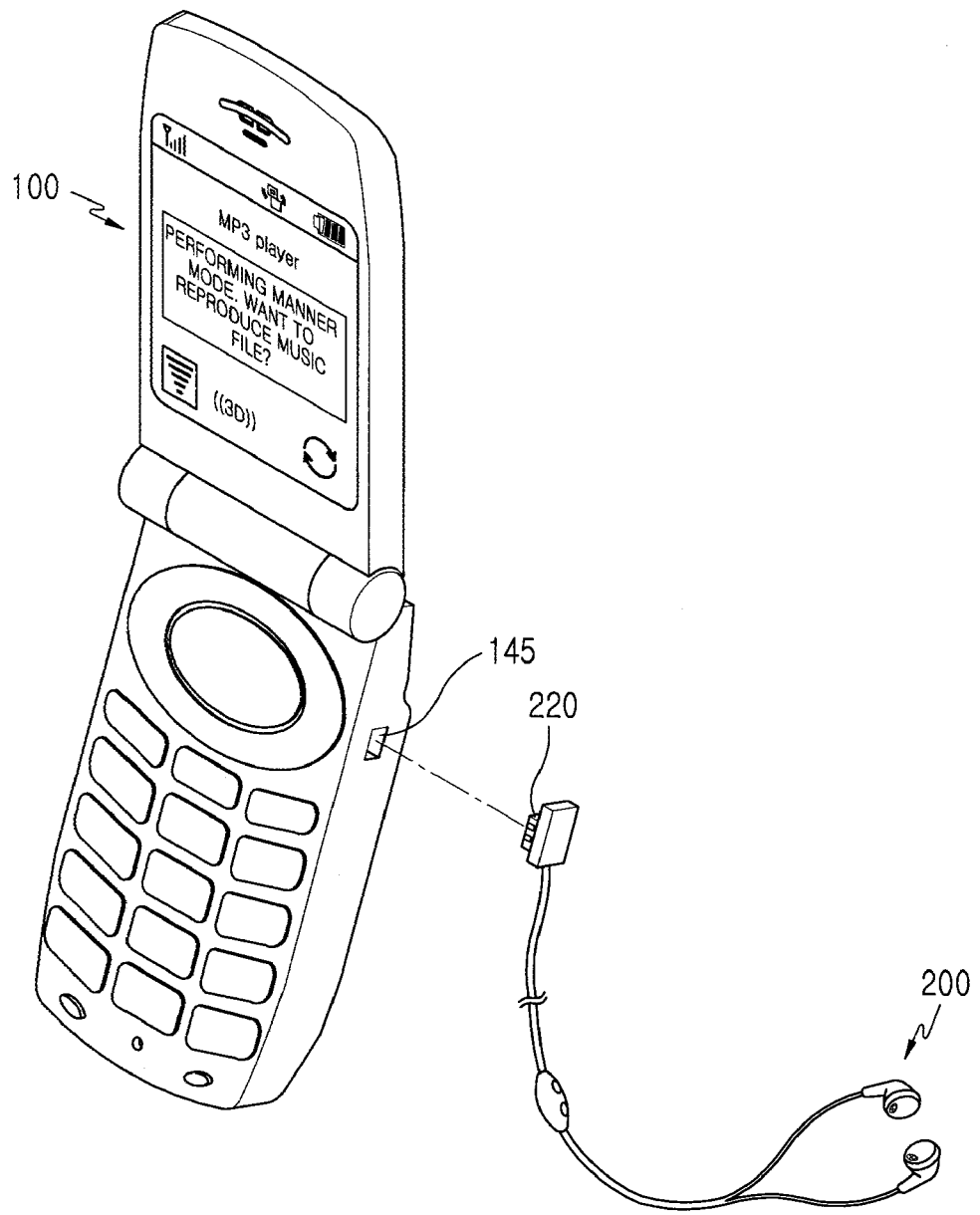
FIGS. 4A and 4B are exemplary views for explaining the operation of a mobile communication terminal according to an exemplary embodiment of the present invention.
Figure 4B:
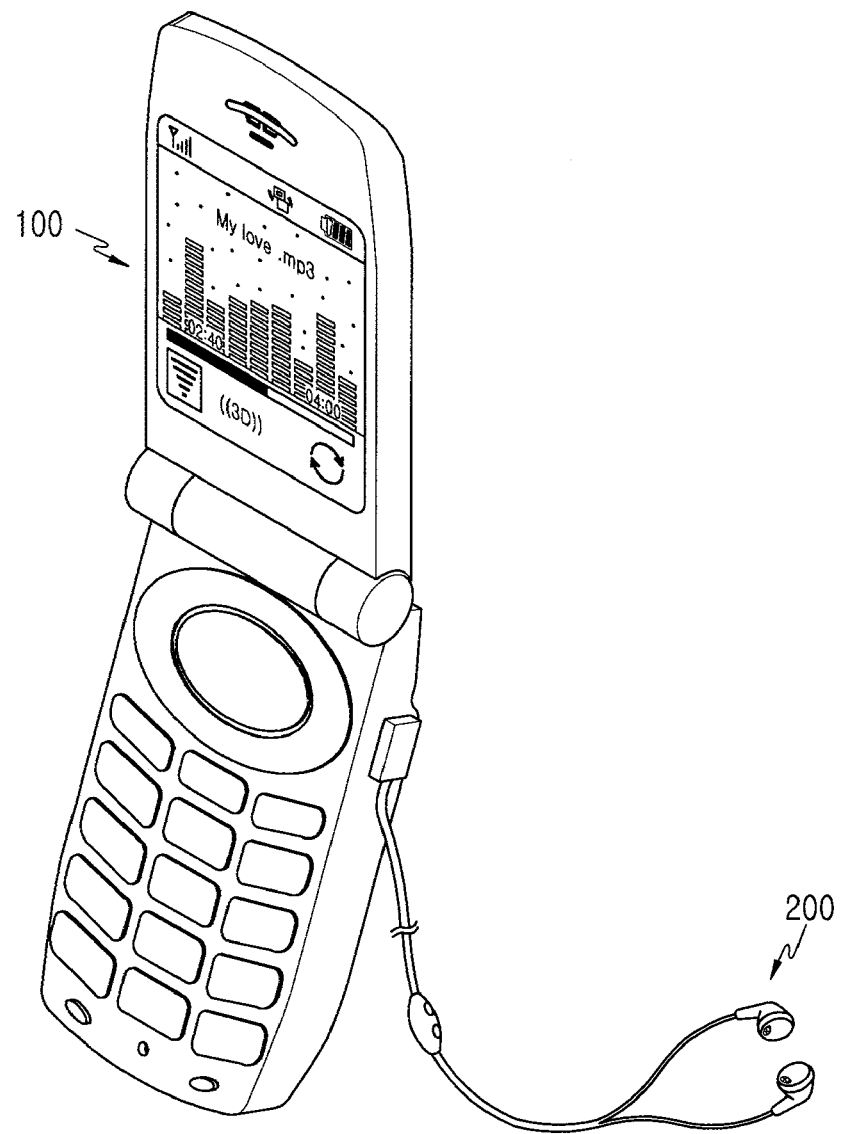

FIGS. 4A and 4B are exemplary views for explaining the operation of the mobile communication terminal according to an exemplary embodiment of the present invention.

FIG. 4A shows the mobile communication terminal 100 and the earphone 200 to explain the operation of the mobile communication terminal 100 according to an exemplary embodiment of the present invention.

Referring to FIG. 4A, the earphone jack 220 is not inserted into the jack connecting unit 145 of the mobile communication terminal 100, and the confirmation message for determining whether the music files are to be reproduced or not in response to the request for the reproduction of the music files during the manner mode is being output on the screen.

In the state of FIG. 4A, if the earphone jack 220 is inserted into the jack connecting unit 145 by the user, the mobile communication terminal 100 determines that the output confirmation message is confirmed by the user and outputs the music files selected by the user through the earphone 200 as shown in FIG. 4B.

Figure 5:
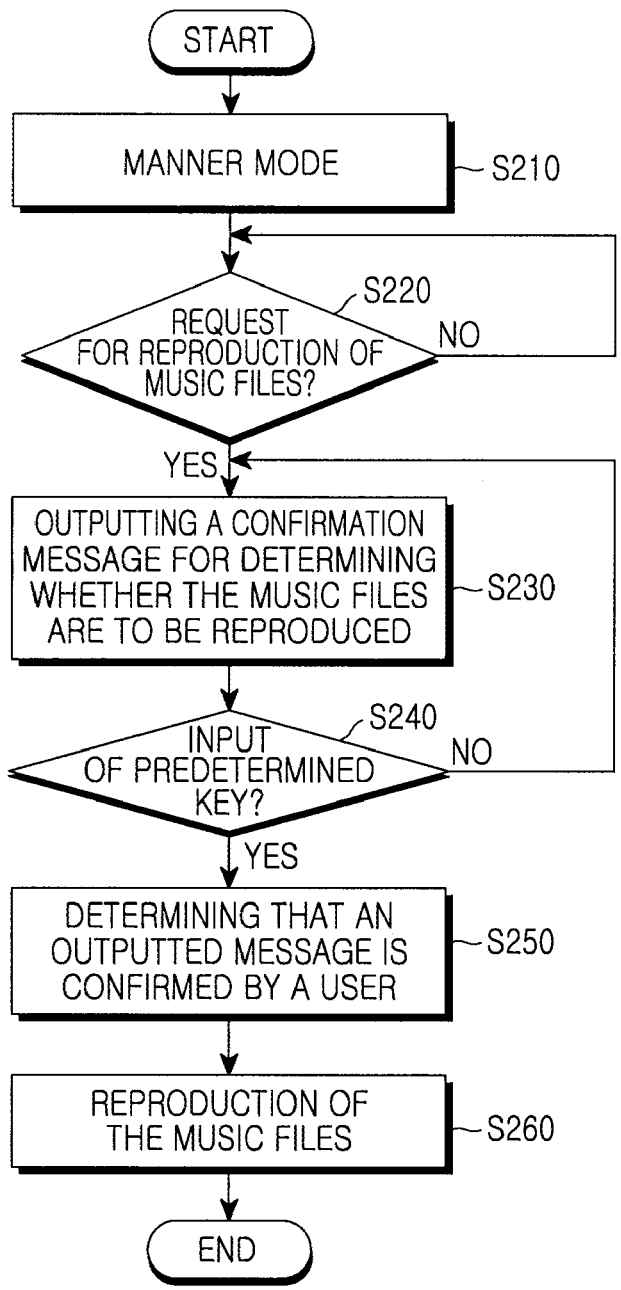
FIG. 5 is a flow chart for explaining a music file reproducing process of a mobile communication terminal according to an exemplary embodiment of the present invention.

FIG. 5 is a flow chart for explaining a music file reproducing process of a mobile communication terminal according to an exemplary embodiment of the present invention.

Hereinafter, FIG. 5 will be explained with reference to FIGS. 1 and 2.

The control unit 160 converts the signal receiving sound output mode to the manner mode on the basis of a request from a user and performs the corresponding operation at step S210.

The control unit 160 examines whether the reproduction of the music files, for example, MP3 files, is requested by the user during the manner mode of the mobile communication terminal 100 at step S220.

If the reproduction of the music files is requested by the user, after starting the music file reproduction mode, for example, MP3 reproduction mode, of the mobile communication terminal 100, the control unit 160 outputs the confirmation message for determining whether the music files are to be reproduced or not when performing the manner mode at step S230. The confirmation message informs the user that the mobile communication terminal 100 is performing the manner mode when the reproduction of the music files is requested by the user, and enables the user to confirm whether the music files are to be reproduced or not during the manner mode of the mobile communication terminal 100. The confirmation message is output in a voice message through the audio processing unit 130 or in a letter message through the display unit 190.

If a predetermined key, for example, confirmation key, is input at step S240, the control unit 160 determines that the user confirmed the output confirmation message at step S250. It is preferable that the predetermined key is the confirmation key provided in the key input unit 140. Further, the predetermined key can be a key provided or embodied for the reproduction of the music files.

If the confirmation message is determined to be confirmed by the user, the control unit 160 reproduces the music files selected by the user at step S260. The audio signals of the reproduced music files are output through the speaker of the audio processing unit 130.

On the other hand, in the case where incoming call signals are received during the reproduction of the music files, it is preferable that the control unit 160 stops the reproduction of the music files and outputs an indication of the reception of the incoming call signal without sound or by vibration according to the set manner mode.

Figure 6A:
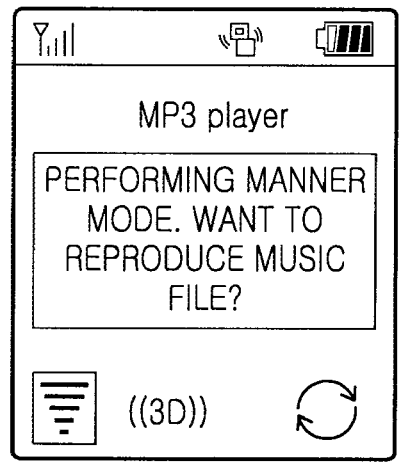
FIGS. 6A and 6B are exemplary views for explaining the operation of a mobile communication terminal according to an exemplary embodiment of the present invention.
Figure 6B:
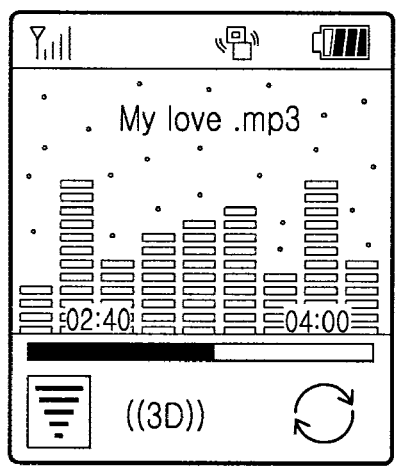

FIGS. 6A and 6B are exemplary views for explaining the operation of the mobile communication terminal according to an exemplary embodiment of the present invention.

FIG. 6A shows a screen outputting the confirmation message for determining whether the music files are to be reproduced or not in response to the reproduction request of the music files during the manner mode of the mobile communication terminal 100.

If a user inputs a key or a confirmation key for the reproduction of the music files in the state of FIG. 6A, the mobile communication terminal determines that the user confirmed the confirmation message or that the music files can be reproduced, and reproduces the music files selected by the user together with the music file reproduction screen as shown in FIG. 6B.

According to exemplary embodiments of the present invention, a user can reproduce and listen to music files without any complex key manipulation even during the manner mode of the mobile communication terminal.

While the invention has been shown and described with reference to exemplary embodiments thereof, it will be understood by those skilled in the art that various changes in form and details may be made therein without departing from the spirit and scope of the invention as defined by the appended claims.

According to the present invention, since a user can reproduce music files without any complex key manipulation even during the manner mode of the mobile communication terminal, the user can listen to wanted music easily, thereby improving the convenience of the mobile communication terminal.

What is claimed is:

1. A method of a mobile communication terminal in a silent mode for reproducing a music file and outputting audio signals, corresponding to the music file being reproduced, through a speaker of the mobile communication terminal or an external audio output device, wherein in the silent mode the mobile communication terminal generates a vibration signal in response to receiving an incoming call, the method comprising:
    while the mobile communication terminal is in the silent mode, reproducing the music file and outputting the audio signals, corresponding to the music file being reproduced, through the speaker of the mobile communication terminal;
    detecting a connection between the external audio output device and the mobile communication terminal;
    based on the detection of the connection between the external audio output device and the mobile communication terminal, outputting the audio signals, corresponding to the music file being reproduced, to the external audio output device;
    during the outputting of the audio signals to the external audio output device, detecting a disconnection between the external audio output device and the mobile communication terminal; and
    based on the detection of the disconnection between the external audio output device and the mobile communication terminal, providing a user interface for continuing reproduction of the music file.

2. The method of claim 1, wherein, in the silent mode, sound alerts of the mobile communication terminal in response to the receiving of the incoming call are disabled.

3. The method of claim 1, further comprising:
    in response to the receiving of the incoming call during the reproducing of the music file in the silent mode, suspending the reproduction of the music file and generating the vibration signal.

4. The method of claim 1, wherein the mobile communication terminal comprises a touch screen to display and receive a touch input.

5. The method of claim 4, wherein the user interface is displayed on the touch screen to receive a user input on the touch screen corresponding to a user selection to continue the reproduction of the music file.

6. The method of claim 1, wherein the detection of the connection between the external audio output device and the mobile communication terminal occurs while the music file is being reproduced.

7. The method of claim 1, wherein the connection between the external audio output device and the mobile communication terminal is made through a wired interface.

8. The method of claim 1, wherein the connection between the external audio output device and the mobile communication terminal is made through a Bluetooth communication interface.

9. A mobile communication terminal comprising:
    an audio processing unit;
    a speaker;
    a connecting unit to connect to an external audio output device and to indicate to a control unit whether the external audio output device is connected to the connecting unit;
    a display unit; and
    the control unit configured to:
        while in a silent mode, control the audio processing unit to reproduce a music file and to output audio signals, corresponding to the reproduced music file, through the speaker, the silent mode being a mode in which a vibration signal is generated in response to receiving an incoming call,
        when the external audio output device is connected to the connecting unit, output the audio signals to the external audio output device, and
        when the external audio output device is disconnected from the connecting unit while the audio signals are being output to the external audio output device, control the display unit to display a user interface for continuing reproduction of the music file.

10. The mobile communication terminal of claim 9, wherein, in the silent mode, sound alerts of the mobile communication terminal in response to the receiving of the incoming call are disabled.

11. The mobile communication terminal of claim 9, wherein the control unit is further configured to, in response to the receiving of the incoming call while the music files are being reproduced in the silent mode, suspend the reproduction of the music file and generate the vibration signal.

12. The mobile communication terminal of claim 9, wherein the display unit is a touch screen that operates as a display unit and an input unit.

13. The mobile communication terminal of claim 12, wherein the user interface is displayed on the touch screen to receive a user input on the touch screen corresponding to a user selection to continue the reproduction of the music file.

14. The mobile communication terminal of claim 9, wherein the control unit is further configured to output the audio signals to the external audio output device if the external audio output device is connected to the connecting unit while the music file is being reproduced.

15. The mobile communication terminal of claim 9, wherein the connection to the external audio output device is through a wired interface.

16. The mobile communication terminal of claim 9, wherein the connection to the external audio output device is made through a Bluetooth communication interface.

17. A mobile communication terminal comprising:
    an audio processing unit;
    a speaker;
    a connecting unit to connect to an external audio output device and to indicate to a control unit whether the external audio output device is connected to the connecting unit;
    a touch screen to display and receive an input; and
    the control unit configured to:
        based on a user request while in a silent mode, control the audio processing unit to reproduce a music file and to output audio signals, corresponding to the reproduced music file, through the speaker, the silent mode being a mode in which a vibration signal is generated in response to receiving an incoming call,
        when the external audio output device is connected to the connecting unit, output the audio signals to the external audio output device, and
        when the external audio output device is disconnected from the connecting unit while the audio signals are being output to the external audio output device, control the touch screen to display a user interface for continuing reproduction of the music file.

18. The mobile communication terminal of claim 17, wherein, in the silent mode, sound alerts of the mobile communication terminal in response to the receiving of the incoming call are disabled.

19. The mobile communication terminal of claim 17, wherein the control unit is further configured to, in response to the receiving of the incoming call while the music files are being reproduced in the silent mode, suspend the reproduction of the music file and generate the vibration signal.

20. The mobile communication terminal of claim 17, wherein the user interface is displayed on the touch screen to receive a user input on the touch screen corresponding to a user selection to continue the reproduction of the music file.

21. The mobile communication terminal of claim 17, wherein the control unit is further configured to output the audio signals to the external audio output device if the external audio output device is connected to the connecting unit while the music file is being reproduced.

22. The mobile communication terminal of claim 17, wherein the connection to the external audio output device is made through a wired interface.

23. The mobile communication terminal of claim 17, wherein the connection to the external audio output device is made through a Bluetooth interface.

* * * * *